Patented May 29, 1934

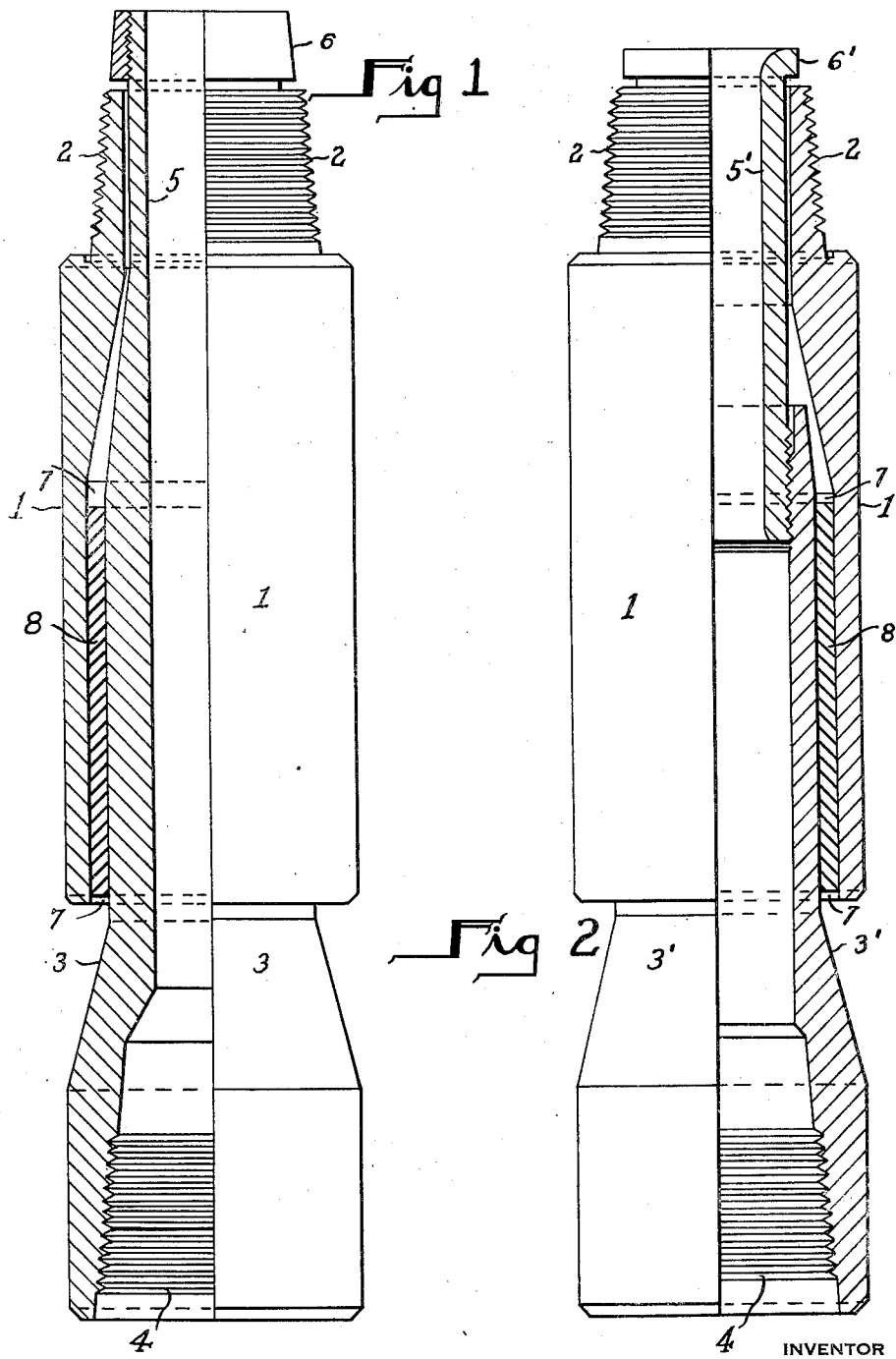

1,960,688

UNITED STATES PATENT OFFICE 1,960,688

RESILIENT TOOL JOINT

Merton T. Archer, Toledo, Ohio, assignor to The National-Superior Company, Toledo, Ohio, a corporation of Delaware Application October 12, 1932, Serial No. 637,422

10 Claims. (Cl. 255-–28)

The principal object of this invention is to provide a means for dampening or reducing the vibrational shock set up in rotary drilling strings during the operation of drilling wells. The usual rigid joints in drill strings develop under certain conditions of operation vibrations producing a destructive action on the drill string, the said vibrations resulting in fatigue failures at or near the joint. In order to reduce this destructive action, I have provided a resilient or cushioning medium between the mating or concentric elements which make up the joints so that the failures resulting from vibration may be very greatly reduced.

The accompanying drawing shows in Figs. 1 and 2, two longitudinal central sections through a drill string joint illustrating two species of the present invention.

Referring to Fig. 1, 1 designates the outer sleeve or hollow member having threads 2 at one end to form the pin end for engagement in the box end of the conventional form of tool joint. 3 is the inner sleeve member having one end telescoped within the member 1 and having its outer portion enlarged and provided with internal threads 4 for threaded connection to a length of drill pipe. The end of the member 3 opposite the threaded box portion 4 is provided with a sleeve extension portion 5 integral with the wall of the member 3. The sleeve extension portion 5 projects beyond the outer end of the pin end of the sleeve 1, and has a short distance beyond the pin end the collar 6.

The sleeves 1 and 3 have therebetween an elongated annular chamber 7 into which a resilient sleeve 8 made of rubber, for example, is forced preferably by very high hydraulic power from a ring of resilient material having a much greater wall thickness and a much shorter length than the wall thickness and length of the resultant sleeve. The resilient material is crowded into the chamber 7 with so great a pressure that the sleeve 8 is retained between the sleeves 1 and 3 by so strong friction therewith that the torsional movement transmitted from the sleeve 3 to the sleeve 1 will be transmitted through the sleeve 8 without any slippage between the surfaces of the sleeve 8 and those of the sleeves 1 and 3. Whatever relative movement may exist between the sleeves 3 and 1 will be confined entirely to the substances of the resilient material forming the sleeve 8. It is thus seen that the vibration and shock received by a rotary drill string is taken up to a large degree by the resilient sleeve 8.

The safety extension 5 having the enlarged collar 6 on the outer end is adapted to engage the outer end of the sleeve 1 in order to relieve the resilient sleeve 8 of excessive longitudinal stresses set up when pulling drill pipe stuck in the well.

Fig. 2 is substantially like Fig. 1 except that the sleeve extension 5' in Fig. 2 is not integral with the member 3', but is connected thereto by the threaded joint. In Fig. 2 the collar 6' is integral with the extension 5'.

I claim:

1. In rotary well drilling apparatus, a tool joint comprising the combination of an outer sleeve, an inner sleeve concentric therewith, there being an annular space between the sleeves, a sleeve of resilient material forced into the said space so that any predetermined torsional force applied from one sleeve through the resilient sleeve will be transmitted without any slippage between the surfaces of the resilient sleeve and the surfaces of the other sleeves in contact therewith, and means comprising parts of the inner and outer sleeves arranged to engage for limiting relative longitudinal movement between said inner and outer sleeves whereby to relieve the resilient material of excessive longitudinal stresses.

2. In a rotary tool joint, an outer sleeve, an inner sleeve concentric therewith, there being an annular space between the sleeves, a sleeve of rubber forced into the said space so that any predetermined torsional force applied from one sleeve through the rubber sleeve will be transmitted without any slippage between the surfaces of the rubber sleeve and the surfaces of the other sleeves in contact therewith, and means comprising parts of the inner and outer sleeves arranged to engage for limiting relative longitudinal movement between said inner and outer sleeves whereby to relieve the resilient material of excessive longitudinal stresses.

3. In a rotary tool joint, an outer sleeve, an inner sleeve concentric therewith, there being an annular space between the sleeves, a sleeve of resilient material forced into the said space so that any predetermined torsional force applied from one sleeve through the resilient sleeve will be transmitted without any slippage between the surfaces of the resilient sleeve and the surfaces of the other sleeves in contact therewith, the inner sleeve having an extension beyond the end of the outer sleeve and provided with a stop collar spaced from the said end of the outer collar to relieve the resilient sleeve of excessive longitudinal stresses.

4. In a rotary tool joint, an outer sleeve, an inner sleeve concentric therewith, there being an annular space between the sleeves, a sleeve of resilient material forced into the said space so that any predetermined torsional force applied from one sleeve through the resilient sleeve will be transmitted without any slippage between the surfaces of the resilient sleeve and the surfaces of the other sleeves in contact therewith, the opposite ends of the outer and inner sleeves being threaded for connection in a drill string, and means comprising parts of the inner and outer sleeves arranged to engage for limiting relative longitudinal movement between said inner and outer sleeves whereby to relieve the resilient material of excessive longitudinal stresses.

5. In rotary well drilling apparatus, a tool joint comprising the combination of an inner tubular member provided at one end with means for connecting the drill pipe, an outer tubular member surrounding the inner member and of sufficient internal diameter to provide an annular space between said members, said outer member having means for connection to the drill stem, an elongated cylindrical sleeve of resilient material compressed in and filling the annular space, whereby when the drill abnormally resists rotation said resilient sleeve will prevent breakage, and means comprising parts of the inner and outer sleeves arranged to engage for limiting relative longitudinal movement between said inner and outer sleeves whereby to relieve the resilient material of excessive longitudinal stresses.

6. For use with rotary drilling apparatus, a tool joint comprising an elongated inner sleeve, an elongated outer sleeve coaxial therewith, resilient material compressed between the concentric adjacent surfaces of the sleeves for resisting abrupt tortional strains preventing a break in the drill string, and means comprising parts of the inner and outer sleeves arranged to engage for limiting relative longitudinal movement between said inner and outer sleeves whereby to relieve the resilient material of excessive longitudinal stresses.

7. For use with rotary drilling apparatus, a tool joint comprising an elongated inner sleeve, an elongated outer sleeve coaxial therewith, resilient material compressed between the concentric adjacent surfaces of the sleeves for resisting abrupt tortional strains and preventing a break in the drill string, and means comprising parts of the inner and outer sleeves arranged to engage for limiting relative longitudinal movement between the inner and outer sleeves whereby to relieve the resilient material of excessive longitudinal strains.

8. In rotary drilling apparatus for wells or the like, a tool joint comprising the combination of an elongated inner cylindrical member having one end provided with means for attaching the drill pipe, an outer cylindrical member surrounding the inner cylindrical member and having a bore of sufficient diameter to provide an annular space of substantially constant diameter between said members, the outer cylindrical member having an end provided with means for attaching the drill stem, a cylindrical sleeve of resilient material tightly compressed in said space, whereby the rotative power is transmitted from the outer member to the inner member through such resilient material and the stress of abnormal resistance of the drill to rotation will be assumed by such resilient material, and means comprising parts of the inner and outer sleeves arranged to engage for limiting relative longitudinal movement between said inner and outer sleeves whereby to relieve the resilient material of excessive longitudinal stresses.

9. In a rotary tool joint, the combination of an outer sleeve, an inner sleeve disposed coaxially therewith and forming therewith a space of annular cross-sectional shape, resilient material packed in said space adjacent one end of said outer sleeve forming an intermediate sleeve surrounding the inner sleeve, the adjacent surfaces of the inner and outer sleeves converging adjacent the other end of the outer sleeve to restrict angular movement between the inner and outer sleeves.

10. In a rotary tool joint, an outer sleeve, an inner sleeve coaxial therewith and extending therethrough, resilient material compressed between concentric surfaces of the sleeves adjacent to one end of the outer sleeve, and a relatively narrower annular space between the sleeves adjacent to the other end of the outer sleeve for limiting their relative angular movement.

MERTON T. ARCHER.